(12) United States Patent
Bland et al.

(10) Patent No.: US 11,030,921 B2
(45) Date of Patent: Jun. 8, 2021

(54) CHANGE DATA DRIVEN TACTILE RESPONSE

(71) Applicant: Wells Fargo Bank, N.A., San Francisco, CA (US)

(72) Inventors: Dennis Wayne Bland, Edwardsville, IL (US); November Michelle Champion, St. Louis, MO (US); Beth Erin Csengody, Olivette, MO (US); Wendi M. Moseley, Arnold, MO (US); Jonathan Paul Sidarous, House Springs, MO (US); Jeffrey Thomas Simpson, Pinehurst, NC (US); Sarah Elizabeth Gries Waters, Leawood, KS (US)

(73) Assignee: Wells Fargo Bank, N.A., San Francisco, CA (US)

( * ) Notice: Subject to any disclaimer, the term of this patent is extended or adjusted under 35 U.S.C. 154(b) by 179 days.

(21) Appl. No.: 16/004,207

(22) Filed: Jun. 8, 2018

(65) Prior Publication Data

US 2019/0378434 A1    Dec. 12, 2019

(51) Int. Cl.
*G06F 3/048* (2013.01)
*G09B 21/00* (2006.01)
*G08B 6/00* (2006.01)
*G06Q 40/06* (2012.01)
*G10L 15/22* (2006.01)
*G06F 3/0484* (2013.01)

(52) U.S. Cl.
CPC ........... *G09B 21/005* (2013.01); *G06Q 40/06* (2013.01); *G08B 6/00* (2013.01); *G09B 21/007* (2013.01); *G10L 15/22* (2013.01); *G06F 3/04842* (2013.01); *G10L 2015/223* (2013.01)

(58) Field of Classification Search
CPC ..................... G06F 3/011; G06F 3/016; G06F 2203/013–014
See application file for complete search history.

(56) References Cited

U.S. PATENT DOCUMENTS

| 6,349,290 | B1 | 2/2002 | Horowitz et al. |
| 8,566,184 | B1 * | 10/2013 | Paluck ................... G06Q 40/06 705/30 |
| 9,648,171 | B1 | 5/2017 | Eftekhari et al. |
| 9,710,814 | B2 | 7/2017 | Gorny |
| 2006/0136821 | A1 * | 6/2006 | Barabe .................. G06F 40/197 715/205 |
| 2009/0234774 | A1 | 9/2009 | Segal et al. |

(Continued)

FOREIGN PATENT DOCUMENTS

WO    WO-2017112496 A1    6/2017

*Primary Examiner* — Claudia Dragoescu
(74) *Attorney, Agent, or Firm* — Schwegman Lundberg & Woessner, P.A.

(57) ABSTRACT

Various examples described herein are directed to systems, methods, and computer-readable medium for providing a tactile response. A document that includes visual data is received. Change data for the visual data that indicates changes in data values of the visual data from a previous time is received. The visual data is rendered. An indication that a section of the document is selected is received. The section includes a first visual data. A change of the first visual data is determined from the change data. A tactile response unit is controlled to provide a tactile response based on the change of the first visual data.

11 Claims, 5 Drawing Sheets

(56) References Cited

U.S. PATENT DOCUMENTS

| | | | |
|---|---|---|---|
| 2011/0016387 A1* | 1/2011 | Mundy | G06F 21/6209 |
| | | | 715/255 |
| 2012/0016867 A1* | 1/2012 | Clemm | G06F 16/11 |
| | | | 707/722 |
| 2013/0201115 A1* | 8/2013 | Heubel | G06F 3/0487 |
| | | | 345/173 |
| 2014/0039975 A1 | 2/2014 | Hill | |
| 2014/0164894 A1* | 6/2014 | Bellamy | G06F 16/957 |
| | | | 715/209 |
| 2014/0287387 A1 | 9/2014 | Vukasinovic et al. | |
| 2015/0142446 A1 | 5/2015 | Gopinathan et al. | |
| 2015/0381931 A1* | 12/2015 | Uhma | H04N 7/147 |
| | | | 348/14.03 |
| 2016/0062464 A1* | 3/2016 | Moussette | G06F 3/0416 |
| | | | 345/173 |
| 2017/0148073 A1 | 5/2017 | Nomula et al. | |
| 2017/0310820 A1 | 10/2017 | Kao et al. | |

\* cited by examiner

CHANGE DATA DRIVEN TACTILE RESPONSE

BACKGROUND

Identifying data within a document, such as a web page or financial statement, that has changed from a previous version of the document can be difficult. Identifying sections of a document that have changed, allows a user to quickly understand the differences in the document without having to sort through the unchanged data. Current systems may generate documents with changes marked by altering relevant text. For example, text may be underlined, bolded, boxed, etc., to indicate changed data. Such enhancements, however, may not be readily useful to users with visual impairments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Data in a document may change between viewing. For example, a web page or a financial account statement may change on a daily basis. Quickly identifying changes from a previous document may be useful to convey the changes to a reader. Typical visual cues to highlight changes may not be effective for users with visual impairments. Systems described herein provide a tactile response for the user when the user navigates through the document. This is useful to quickly communicate information to the user. Such a system is beneficial over typical screen reader systems as the user can quickly identify changed sections of a document without having unchanged sections of the document read. In addition, the user may retrieve additional information regarding the changed section. Disclosed systems, therefore, provide a variety of technical advantages including but not limited to, an enhanced user interface that provides tactile responses based on data changes within a document, reducing memory usage, and reducing processor load.

Figure 1:
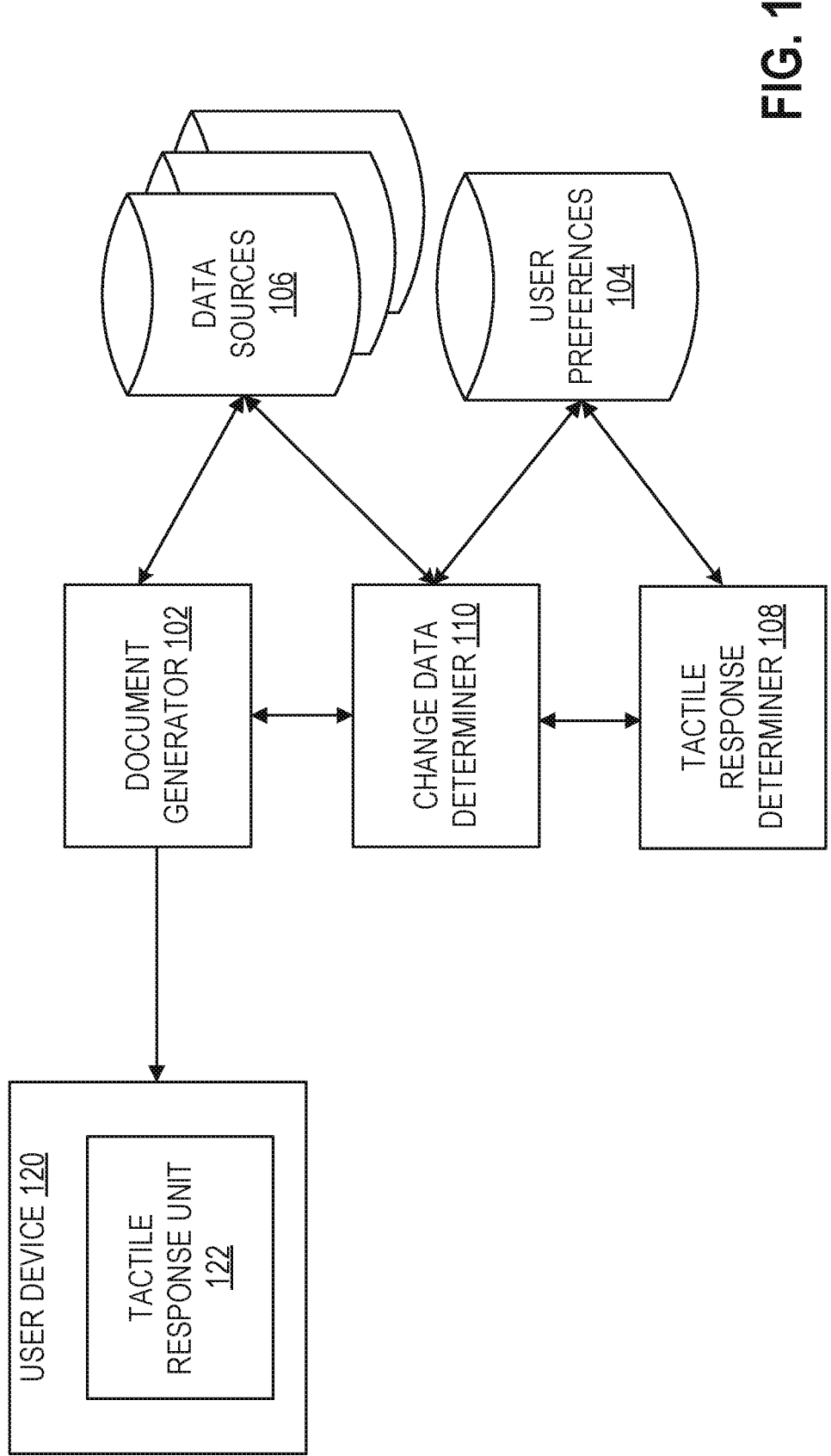
FIG. 1 is a block diagram showing a system for providing tactile response according to some embodiments.

FIG. 1 is a block diagram showing a system 100 for providing tactile response according to some embodiments. The system 100 may be used to generate documents that include data that may be used to provide a tactile response to a user. In an example, the tactile response is generated by a user device 120 when the user is viewing a document. The tactile response may be done via a tactile response unit 122. In an example, the tactile response unit may control a vibration of the user device 120 to provide the tactile response.

The documents generated by the document generator 102 may be a series of related documents where data changes between the documents. Highlighting the changes to the data allows a reader to quickly focus on what has changed from a previous document. A document generator 102 may interface with a change data determiner 110 and a tactile response determiner 108 to construct a document. The change data determiner 110 determines what data has changed from a previous document or time and provides change data to the document generator 102 or the tactile response determiner 108. The document generator 102 or the tactile response determiner 108 may use the change data to create data or instructions for the user device 120. For example, the instructions may instruct the user device 120 to provide a tactile response when a section of the document is viewed or selected. The instructions may be embedded within the document or provided separately from the document. The instructions may include various parameters such as, but not limited to, a strength indicator that indicates how strong the tactile response should be, a pattern for the tactile response, a tactile response length, etc.

In an example, the tactile response determiner 108 may be implemented on the user device 120. In this example, the document generator 102 may provide the change data to the user device 120. The tactile response determiner 108 on the user device 120 may then use this change data to determine the appropriate tactile response. The user preferences may also be stored in the document by the document generator, stored locally on the user device 120, or may be accessed by the user device 120. The change determiner may be implemented in a distributed system that is accessible by the document generator 102.

In an example, the change data determiner 110 accesses current and previous data from data sources 106. The data sources 106 may be a database, cloud storage, etc. The change data determiner 110 matches previous values to current values and determines a change value from the previous values. The change data may be calculated as a difference between the current and previous values. As another, the change value may also be based on a maximum or minimum of the data value over a period of time. For example, a current value may be compared to the maximum value of a data value over the past year. The change value may be the difference between these two values. As another example, the change value may be an indication that the current value is a maximum or minimum of that data value. This change value is used to determine if the change value should be highlighted to the user via a tactile response. The tactile response determiner 108 or the change data determiner 110 may utilize user preferences to determine if a change value should be highlighted to the user.

The tactile response determiner 108 or the change data determiner 110 may access user preferences stored in a user preferences 104 data store. In an example, the user preferences 104 may be part of the data sources 106. The tactile response determiner 108 or the change data determiner 110 may use the user preferences 104 to determine which change data to provide to the document generator. For example, the user preferences may provider a threshold indicating how a data value must change for the data value to be included in the change data. User preferences may also indicate which data values can be ignored and which data values should be inspected for possible inclusion in the change data. As an example, a user may indicate that a change in an account balance of more than 1%, 5%, $500, $1,000, etc. should trigger the account balance to be included in the change data. The user may also provide a preference that indicates that changes in a certain sections of a document should be ignored. The user preferences may also indicate how the tactile response should be done for a given change value. In an example, the user preferences may also be provided to the user device 120 as part of the change data. The user device 120 may then use the user preferences to control the tactile response.

Using the change data, the document generator 102 generates a document for a user. The document may be generated based on a request received by a user from the user device 120. The document may also be generated based on a schedule, such as for a monthly statement. In an example, the document generator 102 receives change data from the tactile response determiner 108 and embeds the change data within the document. In another example, the tactile response determiner 108 uses the user preferences 104 to determine which change data should provide a tactile response and how the tactile response should be done. In this example, the tactile response determine 108 may provide instructions for the tactile response. The instructions may be included within the document or provided in a separate document.

Figure 2:
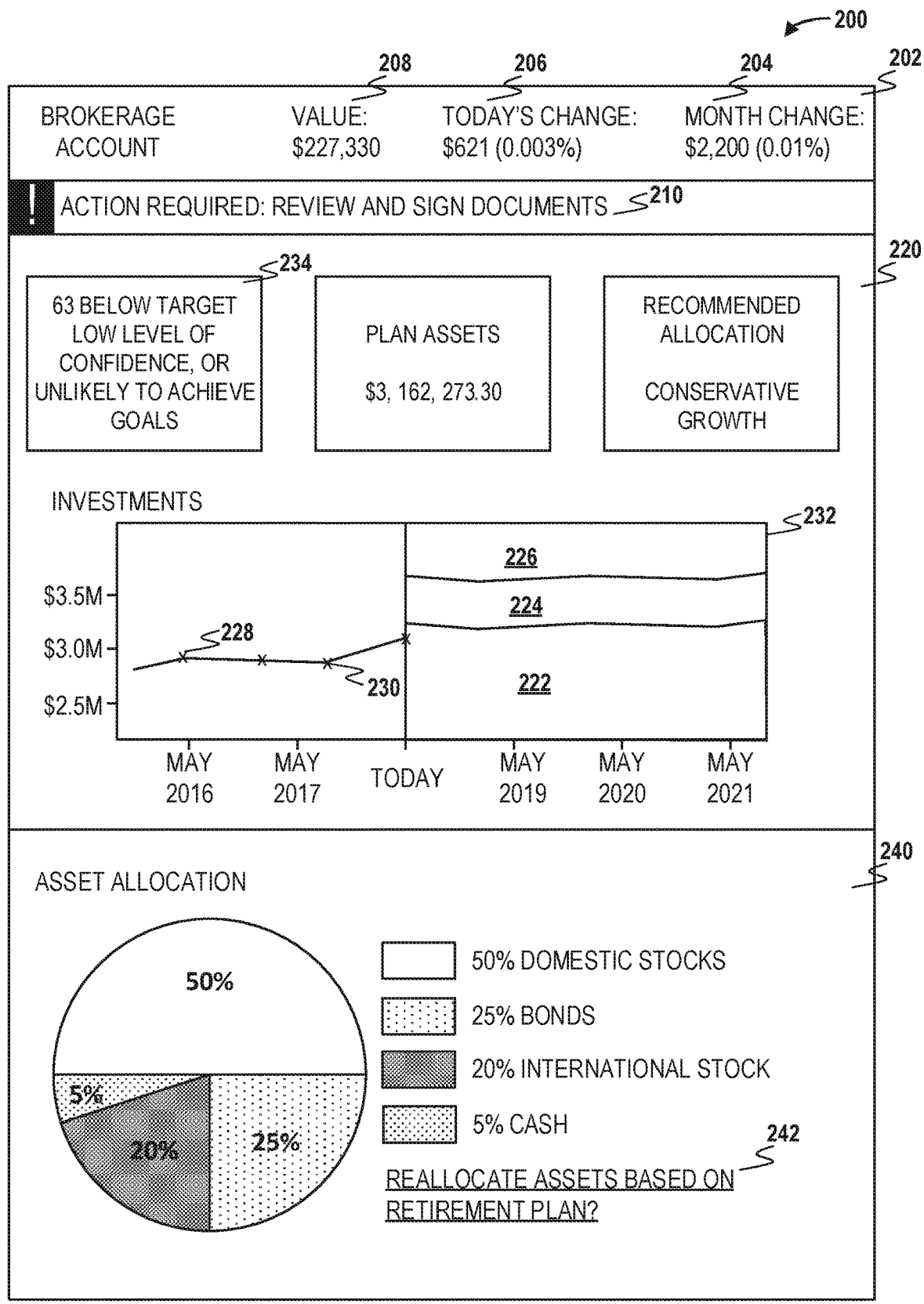
FIG. 2 illustrates an account statement that can provide tactile response according to some embodiments.

An example document that may include a tactile response is a financial account statement displayed on a web page, for example. FIG. 2 illustrates an account statement 200 that can provide tactile responses according to some embodiments. The account statement 200 is generated by the document generator 102 based on change data from the change data determiner 110. In this example, the change data may be determined from the previous account statement. In other examples, the change data may be based on the last login of the user to a document accessing site or application, the user's last access of the document, etc. In another example, the document generator 102 may receive an indication from the user device 120 that indicates the previous time to use. For example, the available previous times may be presented to and selected by the user. The document generator 102 may request change data values from the change data determiner 110 for a particular document. The document generator 102 may also provide the previous time to use. In some examples, the document generator 102 may also provide a "current" time to use that is not actually the current time. In this way, an older document may be recreated at anytime.

The change data determiner 110 determines the change data values based on the previous time, previous data, and the current data. For example, a current account value 208 can be compared to a previous account value, not shown, to determine the change in account value. The change in account value may then be used to determine if a tactile response should occur when a user selects or moves over the account value 208 or a section 202 of the document that includes the account value 208. The tactile response determiner 108 may use the user preferences 104 associated with the user whose document is being generated to determine if the magnitude of the change in account value is greater than a threshold set in the user preferences 104. The threshold may be associated with the account value 208, the section 202, or the account statement 200. In addition, the user preferences 104 may indicate that the section 202 or the account value 208 should not provide tactile response. The tactile response determiner 108 may repeat this process for any or all of the data values within the account statement 200 such as a today's change 206, a month's change 204, historical values 226 and 228, and future value ranges 220, 222, and 224. The various change data values may be returned to the document generator 102.

The tactile response determiner 108 may determine what tactile responses should be done for the change data values. The tactile response properties may be determined from the user preferences, the data value, the data change value, or a combination. For example, the tactile response's length may be proportional to the change data value. In addition, a short vibration before a second vibration may be used to indicate a direction of the change. For example, the short vibration may indicate a negative change in the data value. User preferences may also indicate patterns, length, intensity, etc. of the tactile response. In addition, a tactile response may be combined with audio cues.

In the example account statement 200, a user may have indicated that a change of the month change data value of more than $500 should provoke a tactile response. In addition, the user may indicate that the intensity of the tactile response increase for every $500. As another example, the user may indicate that the tactile response should be a short vibration for each $1,000 change. This tactile response could also be accompanied with an audio cue of the phrase "month change." Accordingly, a visually impaired user would receive two short bursts along with the audio cue when touching the month change 206 field or the section 202.

The tactile response determiner 108 may also take into account new data, data the requires user input, financial advisor input, or user goals in determining what data should be accompanied with a tactile response. For example, a user may need to review and sign additional documents. The account statement 200 may include a visual message 210 to alert the user to this need. A visually impaired user, however, may miss this visual message 210. The tactile response determiner 108 may determine from the data sources 106 that an alert indicating the need to review and sign documents is included in the account statement 200. A tactile response may be added to the visual message 210 such that when the user passes over the visual message 210 a tactile response is given.

After receiving the tactile response, the user may select the visual message 210 or corresponding section to receive additional information. For example, the visual message 210 may be read with a screen reader or output via audio based on instructions within the document. The user may also be taken to documents that need to be reviewed or the documents may be printed. A user may also elect to contact via a phone call, email, chat, etc., a financial advisor that can help them with the documents.

In an example, the document may be displayed on the user device 120. As the user moves their finger over the account statement, tactile responses associated with different sections of the document may be provided. For example, when the user is touching anywhere within the section 202, a tactile response regarding the change values associated with the account value 204, the today's change 208, and the month's change 210 may all be given. The user may select the section 202, via speech commands, tapping on the section 202, or pressing down within the section 202 for a period of time. Once selected, additional information regarding the individual items within the section 202 may be provided. For example, the data values for the account value 204, the today's change 208, and the month's change 210 may read by a screen reader.

As the user continues to move their finger around the account statement 200, the visual message 210 may invoke a tactile response. The user may select this section as noted above. In addition, because this section includes an alert section, an audio cue may also be output when the user is viewing or touching within this section without requiring the user to select the section before providing the audio cue. As another example, the tactile response may also indicate that this is an alert section for the user via the tactile response's pattern. In another example, the tactile response may include the screen glowing bright to provide an additional visual indicator of the alert.

As the user moves into section 220, a tactile response may be given based on item 234 that indicates that the user's savings is below their target savings amount. The tactile response determiner 108 may determine a tactile response should be included in the account statement 200 based on a user preference indicating the user wants to be alerted when they are not meeting their savings goals. In addition, the tactile response may be determined from a change in score or based on the user being below their goal based on financial advisor preferences. For example, the financial advisor may provide a preference that a tactile response should be included in the account statement 200 whenever the user is below or first drops below any of the user's goals.

The section 220 also includes a history and future account value graph 232. Included in the historical and future account value graph 232 are historical value values 228, 230 and future bands 222, 224, and 226 with projected account values. The historical account values 228 and 230 may have a tactile response based on the previous historical value within the graph. The user may move a finger across the graph 232 and be given tactile responses based on the historical values, such as 228 and 230. In addition, a tactile response may occur when the user crosses over from the historical values portion to any of the future bands 222, 224, and 226.

In an example, when the user is provided with a tactile response an indication that the tactile response was provided may be sent to a financial advisor. For example, the tactile response corresponding to the item 234 may trigger an indication sent to the financial advisor. Not all tactile responses may generate such a trigger. The trigger allows the financial advisor to determine who has seen corresponding items and who has not. In an example, the tactile response for the item 234 may also provide an audio prompt noting that the user may want to schedule an appointment with their financial advisor to discuss being below their target. The user may indicate a meeting is desired and a schedule request may be sent to the financial advisor for the user, without requiring the user to create and send the request.

Section 240 provides information regarding asset allocation. When the user enters this section 240 by dragging their finger into the section 240, a tactile response may be provided indicating that asset allocation may be done and may be useful. The tactile response determiner 108 may determine to provide a tactile response based on the user's asset allocation differentiating from the user's recommended allocation. For example, the user may have too much of their assets in stocks rather than bonds and cash. The asset allocation and acceptable tolerances may be based on the user's stated allocation, a recommended allocation, user preferences and financial advisor preferences. When the user enters the section 240 or moves over the item 242, the tactile response may be given to alert the user to a possible action. In an example, the financial advisor may provide an indication that the reallocation item 242 should be highlighted for the user. After the tactile response, the user may then select the section 240 as describe above to learn that asset allocation is recommended. The user may then contact the financial advisor or schedule a meeting with the financial advisor as described above. Upon reaching the end of the account statement 200, the user may be provided with a tactile response indicating the end of the account statement 200.

Figure 3:
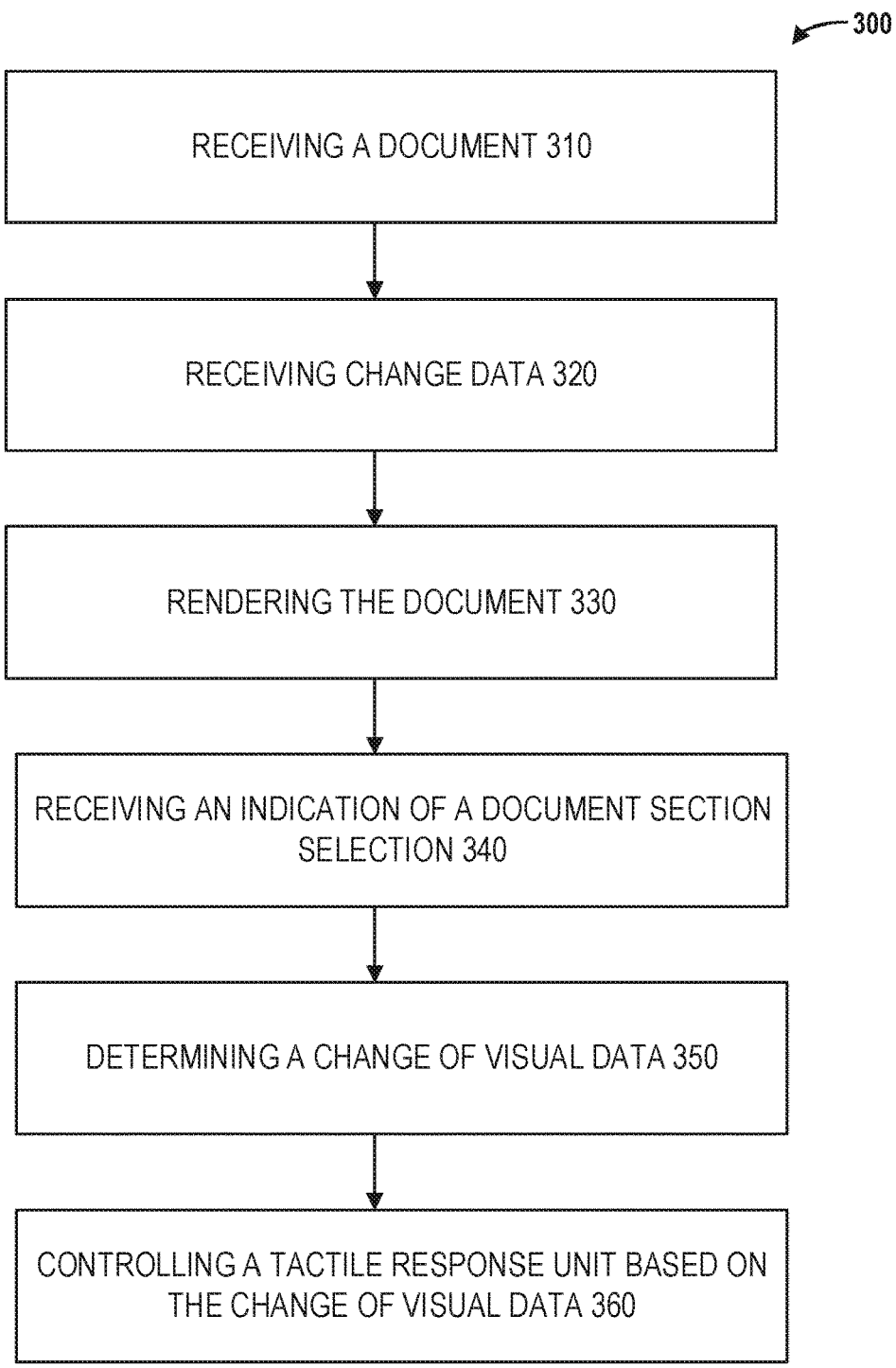
FIG. 3 is a flow diagram showing a tactile response generation process according to some embodiments.

FIG. 3 is a flow diagram showing a financial account statement generation process according to some embodiments. The process 300 may be executed on a computing device. A user device may request a document to be generated or may request a document that has previously been generated for the user. The user device may be used by a financial advisor or a customer. At 310, the user device receives the document. The document includes visual data that will be displayed on the user device. In another example, the document is requested by the user device but sent and displayed on a different device. At 320, change data for the visual data is received by the user device. The change data indicates a change in a data from a previous time that is part of the visual data. The previous time may be the last time login time to a website or application of the user of the user device. The website or application may be used to request the document. In another example, the previous time may be the date and time of a previous version of the document. For example, the document may be an account statement of an account. The previous time may be the date and time that the previous account statement was generated.

At 330, the visual data of the document is rendered on the user device. The document may be rendered such that the document or sections of the document are viewable and accessible on the user device. The document may include a jump to changes input or section. The change section may include a tactile response when the user touches within the change section. The change section may be selected. Once selected the document may move to the next section that includes a tactile response. Upon reaching the last section that includes a tactile response, an end of document or end of changes tactile response may be provided by the user device. The user device may monitor the user's interaction with the document, such that a location where the user is touching or navigating within the document is determined by the user device. At 340, an indication that a section of the document has been selected. The selection may be based on an indication that the user has a finger within the section of the document. The selection of the document contains some of the visual data. At 350, a change of the visual data is determined from the change data. The change of the visual data indicates how the visual data has changed from the previous time.

At 360, a tactile response unit is controlled to provide a tactile response based on the change of the visual data. The tactile response unit may include motors to vibrate the user device. The vibration provides the tactile response to the user. The document may include tactile response parameters that are used to control the tactile response unit. In another example, the user device may determine the tactile response parameters based on the change of the visual data. The response parameters may indicate the length of the tactile response, the pattern of the tactile response, the magnitude or intensity of the tactile response, or any combination of these. For example, the intensity of the vibration may be based on the magnitude of the change data. In an example, the user device may receive or determine from preferences a change data threshold. The change data threshold may then be compared with the change of visual data. If the magnitude of the change of visual data is greater than the change data threshold, then the tactile response may be invoked. Otherwise, the tactile response may not be invoked for that visual data or section of the document.

In an example, tactile responses may not occur for certain visual data or sections of a document based on user preferences. While the user is viewing a document, the user may provide an input to the user device to ignore the section in future documents. The input may be voice input recognized by a speech recognition engine. The speech recognition engine may run on the user device or a remote device such as the document generator, the tactile response determiner, or the change data determiner. The input may be used to update the user preferences that are used to generate future documents.

One example of a generated document is an account statement of an account, such as a financial account, for a user. The visual data may include data such as an account balance, a change in the account balance, asset allocation, historical balances, stock prices, changes in stock prices, recent account activity, goal performance, etc. The tactile response for the visual data may be based on the change value. For example, the tactile response may be different if the change value is positive or negative. A first tactile response for a positive change value may include a short vibration or no vibration at the beginning or end of the tactile response to indicate a positive change value. If the change value is less than zero, then the tactile response may include a different prefix or suffix from the positive change values to indicate the change value is less than zero.

The generated document may allow a user to select visual data or a section of the document. For example, a user may double tap or hold one or multiple fingers down on a section of visual data to select the section or visual data. The user device receives the selection after the tactile response has been provided to the user. Once received, the user device may initiate communication with a financial advisor that is associated with the user's account. In another example, a screen reader is used to read the selected visual data or the selected section. Selection may also allow the user to move to the next section of the document, ignore the section, or provide additional information about the section. For example, additional information may include further details about the visual data. The user preferences may be updated based on the selected sections of the document. For example, sections that are requested to be ignored may be used to update the user preferences to ignore the sections in future documents. As another example, a user may indicate the change threshold should be increased or decreased after the selection and the user preferences are updated accordingly. One type of documents that may be generated are web pages. In an example, a browser plugin may be used to provide the tactile response as described above. The tactile response may also be provided when a document first loads. For example, the tactile response may be based on how many changes are within the document. The user may then be able to request to navigate to the first change in the document. In another example, the document includes an input that once selected navigates the user to the first change in the document.

Figure 4:
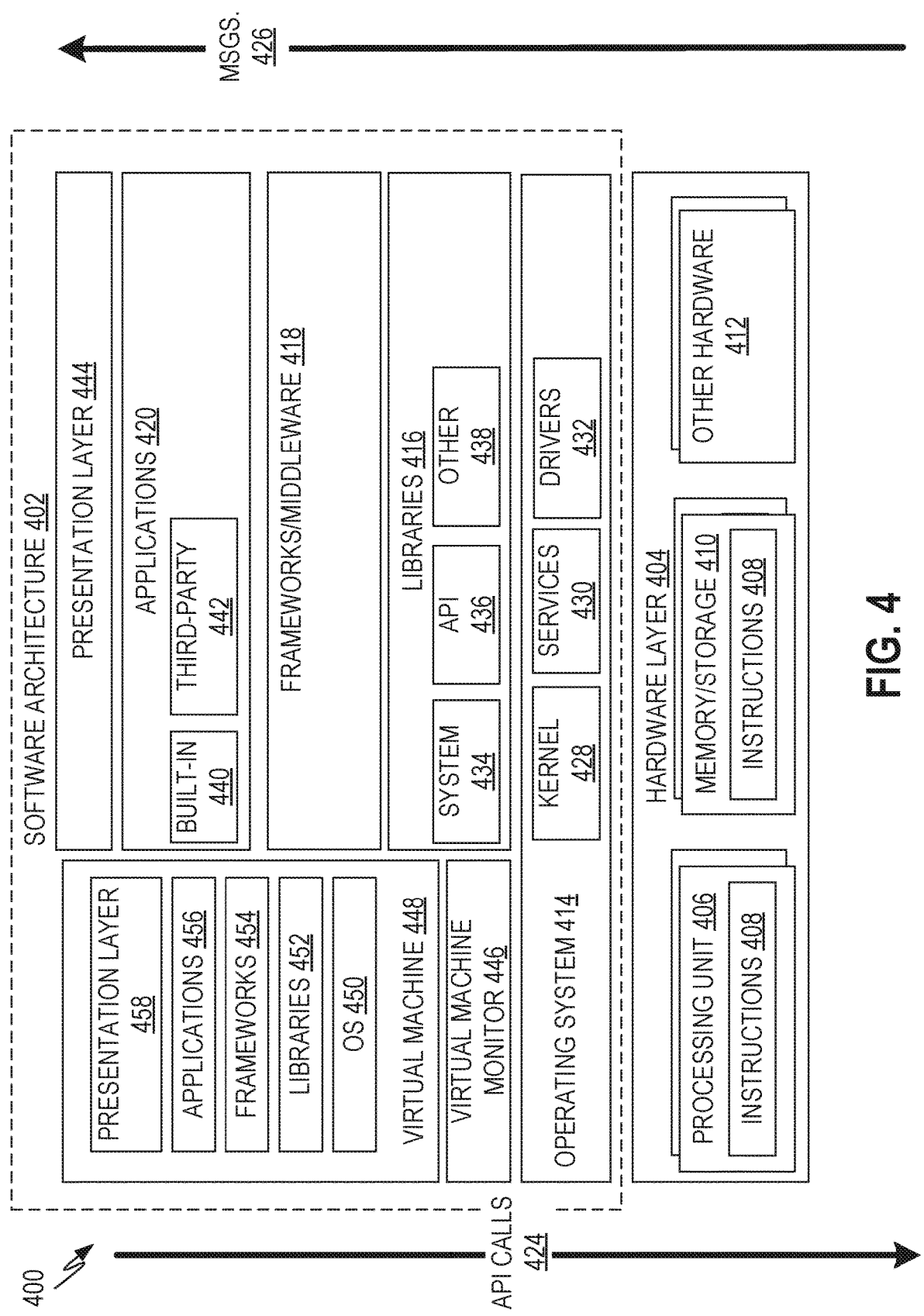
FIG. 4 is a block diagram showing one example of a software architecture for a computing device.

FIG. 4 is a block diagram 400 showing one example of a software architecture 402 for a computing device. The architecture 402 may be used in conjunction with various hardware architectures, for example, as described herein. The software architecture 402 may be used to implement the tactile response determiner 108, the change data determiner 110, and the process 300. FIG. 4 is merely a non-limiting example of a software architecture 402 and many other architectures may be implemented to facilitate the functionality described herein. A representative hardware layer 404 is illustrated and can represent, for example, any of the above referenced computing devices. In some examples, the hardware layer 404 may be implemented according to the architecture 402 of FIG. 4.

The representative hardware layer 404 comprises one or more processing units 406 having associated executable instructions 408. Executable instructions 408 represent the executable instructions of the software architecture 402, including implementation of the methods, modules, components, and so forth of FIGS. 1-3. Hardware layer 404 also includes memory and/or storage modules 410, which also have executable instructions 408. Hardware layer 404 may also comprise other hardware as indicated by other hardware 412 which represents any other hardware of the hardware layer 404, such as the other hardware illustrated as part of hardware architecture 500.

In the example architecture of FIG. 4, the software architecture 402 may be conceptualized as a stack of layers where each layer provides particular functionality. For example, the software architecture 402 may include layers such as an operating system 414, libraries 416, frameworks/middleware 418, applications 420 and presentation layer 444. Operationally, the applications 420 and/or other components within the layers may invoke application programming interface (API) calls 424 through the software stack and receive a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g, scheduling), component management, networking security settings, and so on. The services 430 may provide other common services for the other software layers. In some examples, the services 430 include an interrupt service. The interrupt service may detect the receipt of a hardware or software interrupt and, in response, cause the software architecture 402 to pause its current processing and execute an interrupt service routine (ISR) when an interrupt is received. The ISR may generate the alert, for example, as described herein.

The drivers 432 may be responsible for controlling or interfacing with the underlying hardware. For instance, the drivers 432 may include display drivers, camera drivers, Bluetooth® drivers, flash memory drivers, serial communication drivers (e.g, Universal Serial Bus (USB) drivers), Wi-Fi® drivers, NFC drivers, audio drivers, power management drivers, and so forth depending on the hardware configuration.

The libraries 416 may provide a common infrastructure that may be utilized by the applications 420 and/or other components and/or layers. The libraries 416 typically provide functionality that allows other software modules to perform tasks in an easier fashion than to interface directly with the underlying operating system 414 functionality (e.g, kernel 428, services 430 and/or drivers 432). The libraries 416 may include system 434 libraries (e.g, C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 and/or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 and/or other software components/modules, some of which may be specific to a particular operating system or platform.

The applications 420 includes built-in applications 440 and/or third party applications 442. Examples of representative built-in applications 440 may include, but are not limited to, a contacts application, a browser application, a book reader application, a location application, a media application, a messaging application, and/or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 442 may invoke the API calls 424 provided by the mobile operating system such as operating system 414 to facilitate functionality described herein.

The applications 420 may utilize built in operating system functions (e.g., kernel 428, services 430 and/or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 4, this is illustrated by virtual machine 448. A virtual machine creates a software environment where applications/modules can execute as if they were executing on a hardware computing device. A virtual machine is hosted by a host operating system (operating system 414) and typically, although not always, has a virtual machine monitor 446, which manages the operation of the virtual machine as well as the interface with the host operating system (i.e., operating system 414). A software architecture executes within the virtual machine such as an operating system 450, libraries 452, frameworks/middleware 454, applications 456 and/or presentation layer 458. These layers of software architecture executing within the virtual machine 448 can be the same as corresponding layers previously described or may be different.

Figure 5:
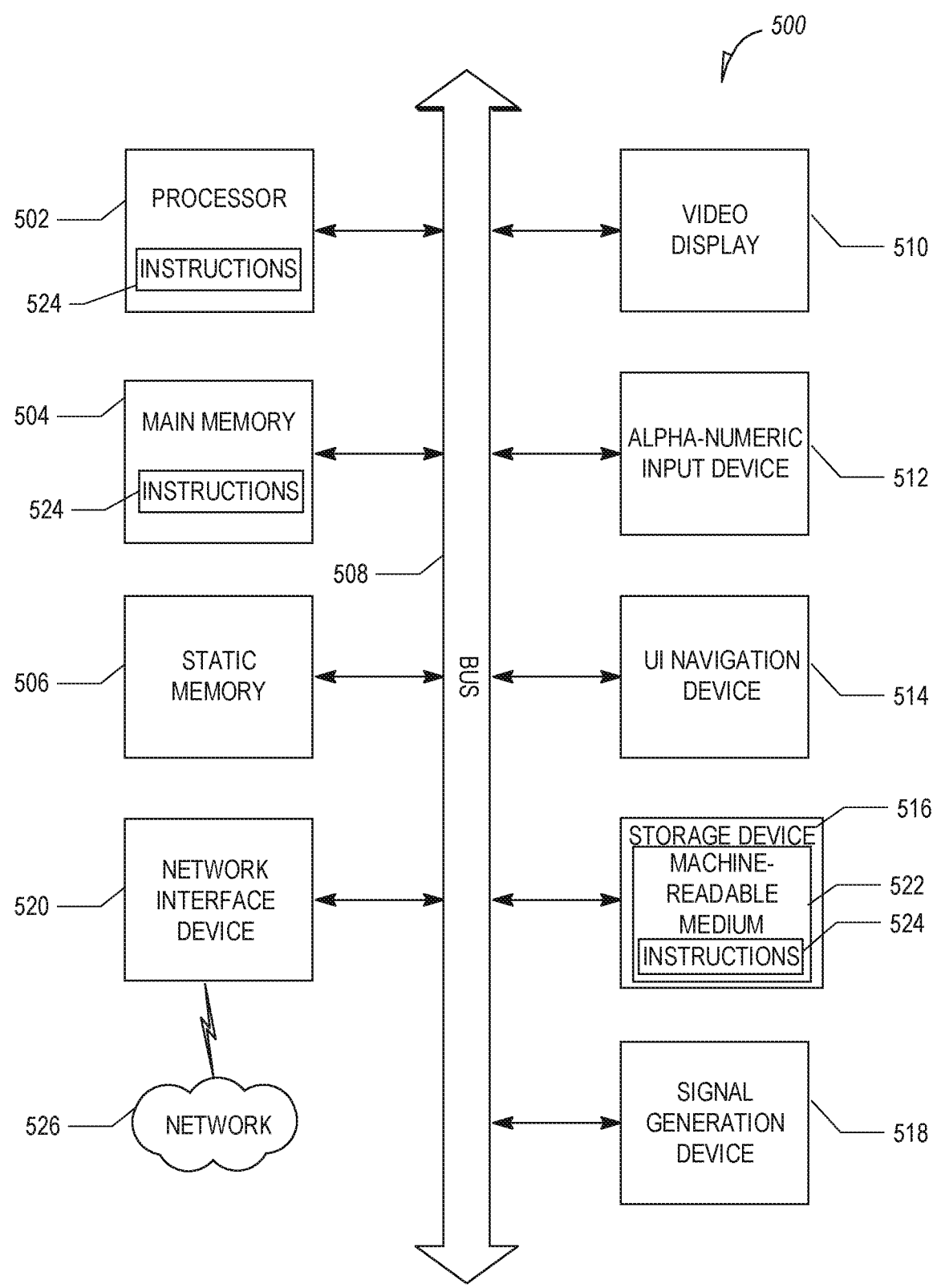
FIG. 5 is a block diagram illustrating a computing device hardware architecture, within which a set or sequence of instructions can be executed to cause the hardware to perform examples of any one of the methodologies discussed herein.

FIG. 5 is a block diagram illustrating a computing device hardware architecture 500, within which a set or sequence of instructions can be executed to cause the machine to perform examples of any one of the methodologies discussed herein. For example, the architecture 500 may execute the software architecture 402 described with respect to FIG. 4. The tactile response determiner 108 and the process 300 may also be executed on the architecture 500. The architecture 500 may operate as a standalone device or may be connected (e.g., networked) to other machines. In a networked deployment, the architecture 500 may operate in the capacity of either a server or a client machine in server-client network environments, or it may act as a peer machine in peer-to-peer (or distributed) network environments. The architecture 500 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 500 includes a processor unit 502 comprising at least one processor (e.g., a central processing unit (CPU), a graphics processing unit (GPU) or both, processor cores, compute nodes, etc.). The architecture 500 may further comprise a main memory 504 and a static memory 506, which communicate with each other via a link 508 (e.g., bus). The architecture 500 can further include a video display unit 510, an alphanumeric input device 512 (e.g., a keyboard), and a user interface (UI) navigation device 514 (e.g., a mouse). In some examples, the video display unit 510, input device 512 and UI navigation device 514 are incorporated into a touch screen display. The architecture 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

In some examples, the processor unit 502 or other suitable hardware component may support a hardware interrupt. In response to a hardware interrupt, the processor unit 502 may pause its processing and execute an interrupt service routine (ISR), for example, as described herein.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the architecture 500, with the main memory 504, static memory 506, and the processor 502 also constituting machine-readable media. Instructions stored at the machine-readable medium 522 may include, for example, instructions for implementing the software architecture 402, instructions for executing any of the features described herein, etc.

While the machine-readable medium 522 is illustrated in an example to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing encoding or carrying instructions for execution by the machine and that cause the machine to perform any one or more of the methodologies of the present disclosure or that is capable of storing encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g, electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g, HTTP). Examples of communication networks include a local area network (LAN), a wide area network (WAN), the Internet, mobile telephone networks, plain old telephone (POTS) networks, and wireless data networks (e.g, Wi-Fi, 3G, and 6G LTE/LTE-A or WiMAX networks). The term "transmission medium" shall be taken to include any intangible medium that is capable of storing encoding or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for tactile response, the apparatus comprising:
an electronic processor configured to:
receive a document comprising visual data to be displayed;
receive change data for the visual data that indicates changes in data values of the visual data from a previous time;
receive a change data threshold;
render the visual data;
receive an indication that a section of the document is selected, wherein the section contains a first visual data;
determine, from the change data, a change of the first visual data; and
control a tactile response unit to provide a tactile response based on the change of the first visual data, the tactile response being a vibration and the tactile response being provided when the first visual data is selected and the change of the first visual data is greater than the change data threshold, wherein to control the tactile response unit the electronic processor is configured to determine an intensity of vibration based on a magnitude of the change of the first visual data.

2. The apparatus of claim 1, wherein the previous time is a last login time of a user.

3. The apparatus of claim 1, wherein the previous time is a date of a previous version of the document.

4. The apparatus of claim 1, wherein the document is an account statement of an account.

5. The apparatus of claim 4, wherein the first visual data is a balance.

6. The apparatus of claim 4, wherein the electronic processor is configured to:
receive a selection of the section of the document associated with the tactile response; and
initiate communication with a financial advisor associated with the account based on the selection.

7. The apparatus of claim 1, wherein the electronic processor is configured to:
receive a selection of the section of the document associated with the tactile response; and
initiate a screen reader to read the section of the document based on the selection.

8. The apparatus of claim 1, wherein the electronic processor is configured to receive a request to ignore the section of the document in future documents, wherein the request is received via speech recognition.

9. A method for providing tactile response, the method comprising operations performed using an electronic processor, the operations comprising:
receiving a document comprising visual data to be displayed;
receiving change data for the visual data that indicates changes in data values of the visual data from a previous time;
receiving a change data threshold;
rendering the visual data;
receiving an indication that a section of the document is selected, wherein the section contains a first visual data;
determining, from the change data, a change of the first visual data; and
controlling a tactile response unit to provide a tactile response based on the change of the first visual data, the tactile response being a vibration and the tactile response being provided when the first visual data is selected and the change of the first visual data is greater than the change data threshold, wherein to control the tactile response unit the electronic processor is configured to determine an intensity of vibration based on a magnitude of the change of the first visual data.

10. The method of claim 9, wherein the previous time is a last login time of a user.

11. A non-transitory machine-readable medium comprising instructions thereon for providing tactile response that, when executed by a processor unit, causes the processor unit to perform operations comprising:
- receiving a document comprising visual data to be displayed;
- receiving change data for the visual data that indicates changes in data values of the visual data from a previous time;
- receiving a change data threshold;
- rendering the visual data;
- receiving an indication that a section of the document is selected, wherein the section contains a first visual data;
- determining, from the change data, a change of the first visual data; and
- controlling a tactile response unit to provide a tactile response based on the change of the first visual data, the tactile response being a vibration and the tactile response being provided when the first visual data is selected and the change of the first visual data is greater than the change data threshold, wherein to control the tactile response unit the processor unit is configured to determine an intensity of vibration based on a magnitude of the change of the first visual data.

* * * * *

UNITED STATES PATENT AND TRADEMARK OFFICE
CERTIFICATE OF CORRECTION

PATENT NO. : 11,030,921 B2
APPLICATION NO. : 16/004207
DATED : June 8, 2021
INVENTOR(S) : Bland et al.

Page 1 of 1

It is certified that error appears in the above-identified patent and that said Letters Patent is hereby corrected as shown below:

On the Title Page

Item (72), in "Inventors", in Column 1, Line 9, delete "Waters," and insert --Morgan,-- therefor Signed and Sealed this
Seventh Day of September, 2021

Drew Hirshfeld
*Performing the Functions and Duties of the
Under Secretary of Commerce for Intellectual Property and
Director of the United States Patent and Trademark Office*